United States Patent
Müller et al.

(10) Patent No.: US 6,646,453 B2
(45) Date of Patent: Nov. 11, 2003

(54) METHOD FOR MEASURING THE THICKNESS OF MULTI-LAYER FILMS

(75) Inventors: Frank Müller, Wuppertal (DE); Stefan Konermann, Remscheid (DE); Norbert Sappelt, Wuppertal (DE)

(73) Assignee: Plast-Control Gerätebau GmbH, Remscheid (DE)

( * ) Notice: Subject to any disclaimer, the term of this patent is extended or adjusted under 35 U.S.C. 154(b) by 8 days.

(21) Appl. No.: 09/992,337

(22) Filed: Nov. 6, 2001

(65) Prior Publication Data

US 2002/0057096 A1 May 16, 2002

(30) Foreign Application Priority Data

Nov. 10, 2000 (EP) .............................. 00124602

(51) Int. Cl.[7] .............................................. G01R 27/26
(52) U.S. Cl. ...................... 324/671; 324/672; 324/663
(58) Field of Search ................................ 324/671, 672, 324/71.5, 663

(56) References Cited

U.S. PATENT DOCUMENTS

| | | | | |
|---|---|---|---|---|
| 3,635,620 A | | 1/1972 | Brown | 425/113 |
| 4,514,812 A | | 4/1985 | Miller et al. | 364/473 |
| 4,952,882 A | * | 8/1990 | Mayer et al. | 324/670 |
| 5,135,689 A | * | 8/1992 | Sensen et al. | 264/411 |
| 5,676,893 A | | 10/1997 | Cree | 264/40.1 |
| 5,993,949 A | * | 11/1999 | Rosenbaum et al. | 428/213 |
| 6,201,399 B1 | * | 3/2001 | Sticha et al. | 324/663 |
| 6,211,094 B1 | * | 4/2001 | Jun et al. | 438/758 |
| 6,403,389 B1 | * | 6/2002 | Chang et al. | 438/18 |

FOREIGN PATENT DOCUMENTS

EP     2038483     7/1980

* cited by examiner

Primary Examiner—N. Le
Assistant Examiner—John Teresinski
(74) Attorney, Agent, or Firm—Richard M. Goldberg

(57) ABSTRACT

A method for capacitively measuring the thickness of multi-layer films (10), the layers (32, 34) the dielectric constants of which differ at least at a particular temperature, wherein, in addition to the capacitive measurement, at least one further thickness measurement is carried out under different conditions, and wherein the thicknesses (d1, d2) of the individual layers is determined by comparing the measurement results and by means of the different dielectric constants.

20 Claims, 2 Drawing Sheets

METHOD FOR MEASURING THE THICKNESS OF MULTI-LAYER FILMS

BACKGROUND OF THE INVENTION

The invention relates to a method for capacitively measuring the thickness of multi-layer films, the dielectric constants of the layers of which differ at least at a particular temperature.

It is well known that the thickness of plastic films can be measured capacitively, because the capacitance of a measuring capacitor, through the electric field of which the film passes, is affected by the thickness of the film and by the dielectric constant of the film material. The results of such thickness measurements are used in the production of plastic films, for example, in the production of tubular film to control the thickness of the film in a closed control circuit, so that high-grade film with a defined thickness, which is essentially constant over the whole width, is obtained.

Since it is difficult in tubular film plants to dispose one of the capacitor plates of the measuring capacitor in the interior of the tubular film, only the edge field of the measuring capacitor is utilized for measurements at the tubular film. In this case, both capacitor plates of the measuring capacitor are disposed outside of the tubular film and oriented at right angles to the plane of the film. On the other hand, if the film web is placed flat, it is also possible to measure the thickness capacitively with the help of a measuring capacitor, the capacitor plates of which are disposed on opposite sides of the film web. Alternatively, a mechanical measuring method can also be used in this case. In every case, the value, obtained for these measurements, is a measure of the total thickness of the film.

For packaging purposes, however, multi-layer films are frequently used, which have a two-layer or multi-layer construction. Packaging films, which are used, for example, to keep food fresh, must not only be sealable and impermeable to water vapor, but also impermeable to air and especially to oxygen. This can be achieved only by multi-layer films, since a single film material by itself does not satisfy all requirements. For example, films of polyethylene (PE) can be sealed and are impermeable to water vapor but not to oxygen. This is the case for low density polyethylene (LDPE), linear polyethylene of low density (LLDPE) as well as high density polyethylene (HDPE). On the other hand, film materials such as polyamide (PA) and ethylene vinyl alcohol (EVOH) are impermeable to oxygen (EVOH only in a dry medium), but cannot be sealed. A frequently used layer construction for packaging films therefore consists of a middle layer of EVOH, which is protected against the effects of water vapor by sealable LDPE layers, which are applied on both sides. However, a bonding agent is inserted between the various layers, so that adhesion of the layers is brought about.

The middle layer of relatively expensive EVOH should be as thin as possible, but not fall below a minimum thickness, so that the impermeability to oxygen remains assured.

SUMMARY OF THE INVENTION

It is an object of the invention to indicate a measuring method, which permits not only the total thickness, but also the thickness of individual layers of a multi-layer film to be determined.

This objective is accomplished in a method of the type named above owing to the fact that, in addition to the capacitive measurement, at least one further thickness measurement is carried under different conditions and that the thicknesses of the individual layers are determined by comparing the results of the measurements and by means of the different dielectric constants.

The invention makes use of the fact that many plastic materials, which are frequently used as a barrier layer for oxygen in multi-layer films, have dielectric constants, which are clearly temperature dependent. Other plastic materials, such as PE, have a dielectric constant, which is almost constant or decreases slightly with increasing temperature up to about 110° C. On the other hand, dielectric constants of materials, such as EVOH or PA, increase clearly above a particular critical temperature. For this reason, the capacitive measurement of the thickness of multi-layer films, which contain such material, had to be carried out at a relatively low temperature until now, that is, generally only after the films have been collapsed, as otherwise the temperature dependence of the dielectric constants would lead to a distortion of the measurement results. However, if two capacitive thickness measurements are carried out at different temperatures, different measurement results are obtained and this difference is a measure of the ratio of the thickness EVOH layer to the total thickness of the film. Since the dielectric constants of the participating materials at the two different measurement temperatures are known, the proportions of the thicknesses of the different materials can be determined quantitatively.

Alternatively, instead of two capacitive measurements at different temperatures, it is also possible to combine a mechanical measurement of the total thickness of the film with a capacitive measurement at a temperature, at which the dielectric constants of the two layer materials differ clearly from one another.

In a preferred embodiment of the invention, a first capacitive measurement during the manufacture of the tubular film is carried out at a relatively high temperature directly on the tubular film and a second capacitive or mechanical measurement takes place after the film has been collapsed at an appropriate, lower temperature.

BRIEF DESCRIPTION OF THE DRAWINGS

In the following, an example of the invention is explained in greater detail by means of the drawings, in which.

DETAILED DESCRIPTION

Figure 1:
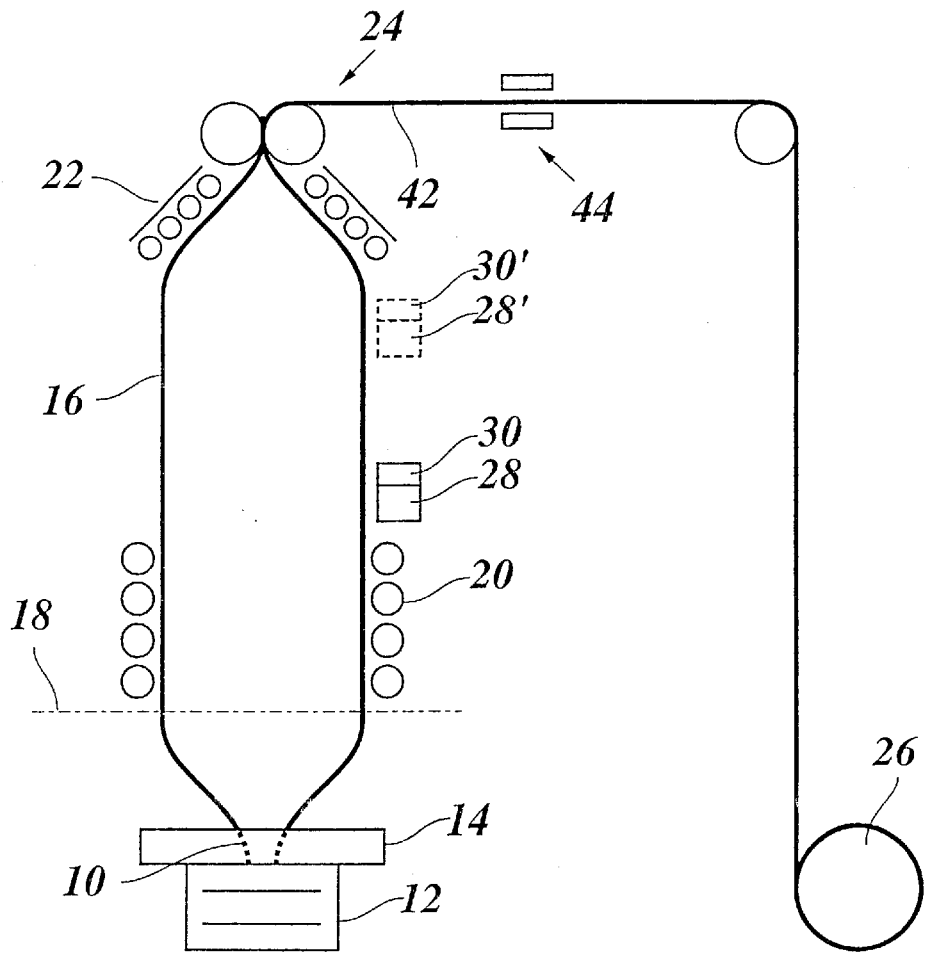
FIG. 1 shows a diagrammatic sketch of a tubular film plant, at which the measurement method is carried out.

According to FIG. 1, a multi-layer film 10 is extruded in the form of a tube on a co-extrusion die 12, cooled with the help of a cooling ring 14 and, at the same time, inflated to a tubular film 16 by blowing in air. The film material is stretched by inflating the tubular film until it finally solidifies at the so-called frost line 18. When the film material passes through a sizing basket 20 and has cooled off sufficiently, it is collapsed at the upper end of the tubular film 16 with the help of a known collapsing device 22 and taken off with the help of a known take-off device 24 and finally rolled up into a coil 26.

Figure 2:
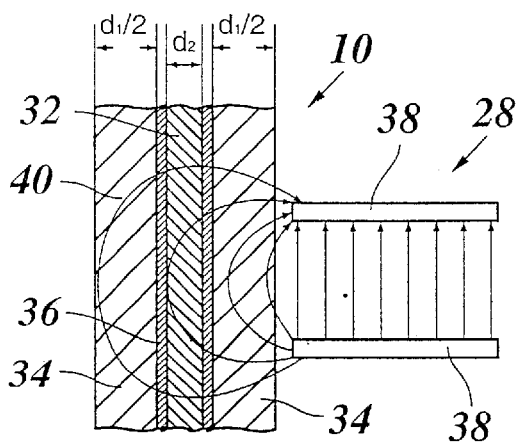
FIG. 2 shows the construction of the layers of a multi-layer film as well as the principle of the thickness measurement with the help of the edge field of a measuring capacitor.

At the periphery of the tubular film 16, closely above the sizing basket 20, a capacitive measuring head 28 is disposed, to which a temperature sensor 30 is assigned and which runs around the periphery of the tubular film 16. The function of this capacitive measuring head is to measure the thickness of the multi-layer film 10. The measuring principle and the construction of the layers of the multi-layer film 10 are shown in FIG. 2.

In the examples shown, the multi-layer film 10 has a symmetrical three-layer construction with a middle layer 32 of ethylene vinyl alcohol (EVOH), which is inserted sandwich-like between two outer layers 34 of equal thickness of low density polyethylene (LDPE). Between the layers 32 and 34, there is still a thin layer of a bonding agent 36, which can, however, be disregarded during the following discussions.

In the examples shown, the measuring head 28 consists essentially of a capacitor, the plates 38 of which are oriented at right angles to the plane of the multi-layer film 10 and, with one edge, directly adjoin the surface of the film. The construction and mode of functioning of measuring head 28 are known and are therefore outlined only briefly here. With the help of an oscillator, which is not shown, an electric alternating voltage is applied to the capacitor plates 38. As a result, a homogeneous electric field is formed between the capacitor plates 38. On the other hand, an inhomogeneous edge field 40, which also penetrates into the multi-layer film 10 and passes through this completely, is formed at the edges of the capacitor plates. The capacitance of the measuring capacitor is therefore affected also by the dielectric material of the layers 32, 34 of the multi-layer film. Together with an inductance, which is not shown, the measuring capacitor forms an oscillating circuit, which is detuned in a characteristic manner by the presence of the multi-layer film 10. The capacitance of the measuring capacitor can be determined precisely by means of the intrinsic frequency of this oscillating circuit.

The capacitance C of the measuring capacitor can be considered to consist additively of three components:

$$C=CO+C1+C2.$$

In the above, CO is the capacitance of the measuring capacitor in the absence of the multi-layer film 10, C1 is an additional capacitance, which is brought about by the two outer layers 34 of the multi-layer film 10 and C2 is an additional capacitance, which is brought about by the middle layer 32 of the multi-layer film.

If d1 is the total thickness of the two outer layers 34 and $\epsilon 1$ is the dielectric constant of the material of these outer layers, C1 can be written as:

$$C1=g1\times\epsilon 1\times d1.$$

In the above, g1 is a geometric factor, which depends on the position of the layers 34 relative to the capacitor plates 38 and takes into consideration the extent of the penetration of this edge field through these layers.

The corresponding applies for the middle layer 32 with the layer thickness d2 and the dielectric constant $\epsilon 2$:

$$C2=g2\times\epsilon 2\times d2.$$

The geometric factors g1 and g2 can be calculated or determined experimentally. Admittedly, these factors are, in principle, also dependent on the layer thicknesses d1 and d2, which are to be measured. However, within the limits of the required accuracy, it is sufficient if the respective nominal values, which are to be adhered to during the manufacture of the multi-layer film, are used as a basis here for the layer thicknesses d1 and d2.

Overall, the following is obtained for the capacitance C of the measuring capacitor, measured with the measuring head 28:

$$C=CO+g1\times\epsilon 1\times d1+g2\times\epsilon 2\times d2.$$

This equation contains two unknowns, namely the two layer thicknesses d1 and d2, and can therefore not be solved unambiguously without additional information.

Figure 4:
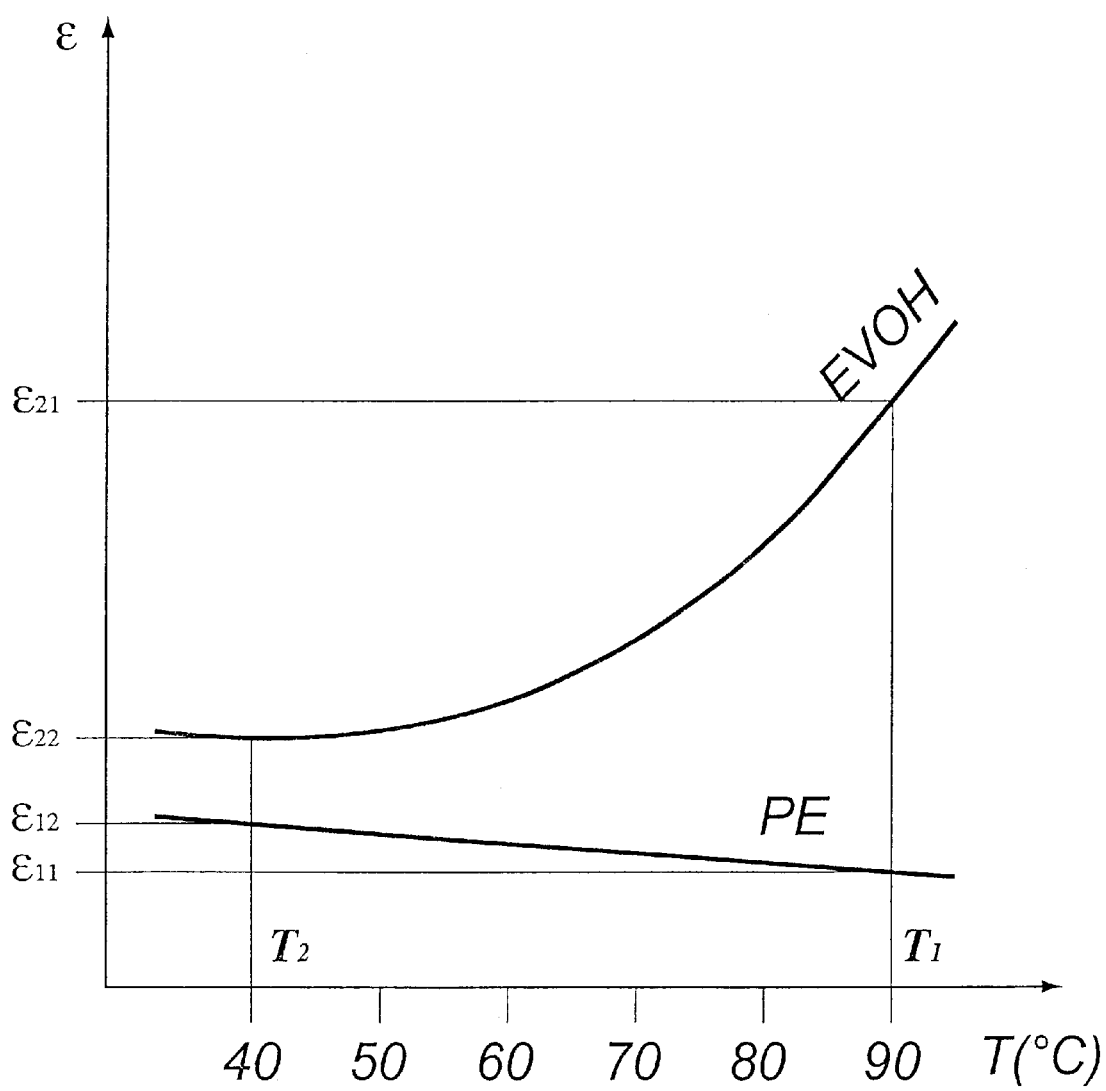
FIG. 4 shows a diagram of the temperature dependence of the dielectric constants of two main components of the multi-layer film of FIGS. 2 and 3.

However, FIG. 4 shows that, in the case of the layer construction considered here, the dielectric constants of the two layer materials used (PE and EVOH) have a clearly different temperature dependence. In particular, it is seen that the two layer materials, at a film temperature T1 of, for example, 90° C., which may exist at the measuring head 28, have greatly different dielectric constants $\epsilon 11$ and $\epsilon 21$, whereas the dielectric constants $\epsilon 12$ and $\epsilon 22$ at a film temperature T2 of 40° C. are closer together. If now, a second capacitive measuring head 28' (optionally with a temperature sensor 30') is disposed in the upper region of the tubular film 16, where the film temperature is about 40° C., two measurement results C(T1) and C(T2) are obtained, which satisfy the following system of equations:

$$C(T1)=CO+g1\times\epsilon 11\times d1+g2\times\epsilon 21\times d2 \qquad (1)$$

$$C(T2)=CO+g2\times\epsilon 12\times d1+g2\times\epsilon 22\times d2 \qquad (2)$$

From this system of equations, the two unknowns d1 and d2 can be determined unambiguously, so that the thickness d2 of the middle layer 32 as well as the sum d1 of the thicknesses of the two outer layers 34 and, with that, the total thickness of the multi-layer film 10 are also obtained (the bonding agent being disregarded).

In this way, it is possible, in spite of considerably different dielectric constants of the two layer materials, to measure the thickness precisely at the periphery of the tubular film 16. The measurement results, so obtained, can be used, on the one hand, to monitor whether the minimum thickness of the middle layer 32 is maintained and, on the other, to control the total thickness of the multi-layer film 10 with the help of the cooling ring 14, as described, for example, in the EP-C-0 478 641. The measurement at the tubular film 16 has the advantage in the latter case, that unavoidable control delays can be kept relatively small.

Figure 3:
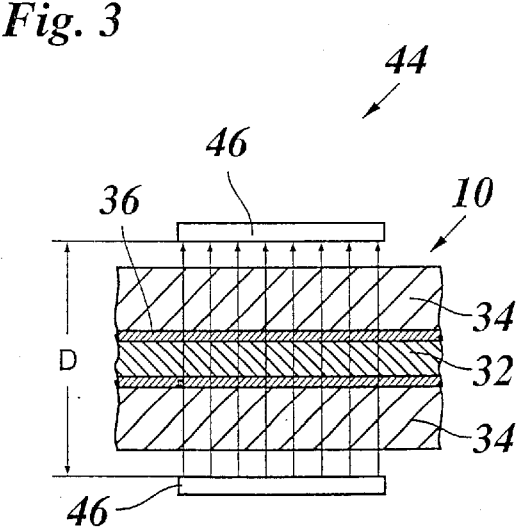
FIG. 3 shows the principle of the thickness measurement with the help of a measuring capacitor, through the field of which the film passes

In the case of the examples shown in FIG. 1, a further measuring head 44, the measuring principle of which is illustrated in FIG. 3, is disposed at the collapsed film web 42. For the sake of simplicity, we have assumed in FIG. 3 that the film web 42 is a single ply film. The principle can, however, also be generalized without problems to a collapsed tubular film, for which two layers of the multi-layer film lie flat on one another.

The measuring head 44 of FIG. 3 also consists essentially of a measuring capacitor. The capacitor plates 46 are, however, disposed on opposite sides of the multi-layer film 10 here and disposed parallel to the latter, so that the total electric field of the capacitor passes through the multi-layer film. For the capacitance of the measuring capacitor, the contribution of the layers 32 and 34 of the multi-layer film, as well as the contribution of the CL of the air layers, must be taken into consideration here, the total thickness of which is equal to the difference between the plate interval D and the total thickness (d1+d2) of the multi-layer film. The combined effects of these individual contributions to the total capacitance correspond here to a connection of the individual capacitances in series:

$$1/C = 1/CL + 1/C1 + 1/C2.$$

If A is the area of the measuring capacitor and $\epsilon 13$ and $\epsilon 23$ are the dielectric constants of the outer layers 34 and of the middle layer 32 respectively at the temperature T3 existing at the measuring head 44 and $\epsilon L$ is the dielectric constant of the air, then:

$$1/C(T3) = (D-d1-d2)/(A \times \epsilon L) + d1/(A \times \epsilon 13) + d2/(A \times \epsilon 23) \qquad (3)$$

Equations (1) and (3) together also form a system of equations, which can be solved for d1 and d2.

Alternatively, it is also possible to do completely without the measuring heads 28 and 28' and, instead, to use two measuring heads 44 with the arrangement shown in FIG. 3 for measuring the film at two different temperatures. Two equations, similar to the equation (3) are then obtained, in which d1 and d2 can be determined once again.

Finally, it is also possible to use, instead of the capacitive measuring head 44, a different measuring head, which measures the total thickness d0 of the multi-layer film, for example, mechanically $$d0 = d1 + d2. \qquad (4)$$

Equation (4) can also be combined with each of the equations (1) to (3) to form a system of equations, by means of which d1 and d2 can be determined unambiguously.

The method can also be generalized without problems to cases, for which the multi-layer film consists of three or more materials with different temperature dependences of the dielectric constants. In each case then, the total thicknesses of the "individual layers", consisting of different materials, is determined. In this connection, it is not impossible that these "individual layers", in turn, are divided into several layers, such as, for example, the layers 34 in FIG. 2. The number of measurements, which must be carried out at different temperatures and/or with different measurement arrangements, corresponds in each case to the number layer thicknesses, which is to be determined.

What is claimed is:

1. A method for capacitively measuring thickness of multi-layer films comprised of individual layers having dielectric constants which differ at least at a particular temperature, comprising the steps of:
    taking a capacitive measurement of a multi-layer film to obtain a first thickness measurement,
    carrying out at least one further thickness measurement under different conditions than conditions used for said capacitive measurement, and
    determining the thicknesses of the individual layers by comparing measurement results from said steps of taking and carrying out and by means of the different dielectric constants.

2. The method of claim 1, wherein measurements during said steps of taking and carrying out are carried out capacitively at different temperatures.

3. The method of claim 2, wherein at least one capacitor measurement is carried out with the help of a measuring head having capacitive plates which are disposed on a same side of the multi-layer film and at right angles to the multi-layer film.

4. The method of claim 2, wherein at least one capacitive measurement is carried out with a measuring head having capacitor plates which are disposed on opposite sides of the multi-layer film and parallel to the multi-layer film.

5. The method of claim 2, further comprising the step of measuring the temperature of the film at a first position and wherein the capacitive measurement of the thickness and the measurement of the temperature of the film are carried out at the same place at said first position.

6. The method of claim 1, wherein the further thickness measurement is a measurement of total thickness of the multi-layer film.

7. The method of claim 6, wherein at least one capacitor measurement is carried out with the help of a measuring head having capacitive plates which are disposed on a same side of the multi-layer film and at right angles to the multi-layer film.

8. The method of claim 6, wherein at least one capacitive measurement is carried out with a measuring head having capacitor plates which are disposed on opposite sides of the multi-layer film and parallel to the multi-layer film.

9. The method of claim 6, further comprising the step of measuring the temperature of the film at a first position and wherein the capacitive measurement of the thickness and the measurement of the temperature of the film are carried out at the same place at said first position.

10. The method of claim 1, wherein at least one capacitor measurement is carried out with the help of a measuring head having capacitive plates which are disposed on a same side of the multi-layer film and at right angles to the multi-layer film.

11. The method of claim 10, wherein the capacitive measurement is carried out at a tubular film.

12. The method of claim 11, wherein at least one capacitive measurement is carried out with a measuring head having capacitor plates which are disposed on opposite sides of the multi-layer film and parallel to the multi-layer film.

13. The method of claim 11, further comprising the step of measuring the temperature of the film at a first position and wherein the capacitive measurement of the thickness and the measurement of the temperature of the film are carried out at the same place at said first position.

14. The method of claim 10, wherein at least one capacitive measurement is carried out with a measuring head having capacitor plates which are disposed on opposite sides of the multi-layer film and parallel to the multi-layer film.

15. The method of claim 10, further comprising the step of measuring the temperature of the film at a first position and wherein the capacitive measurement of the thickness and the measurement of the temperature of the film are carried out at the same place at said first position.

16. The method of claim 1, wherein at least one capacitive measurement is carried out with a measuring head having capacitor plates which are disposed on opposite sides of the multi-layer film and parallel to the multi-layer film.

17. The method of claim 1, wherein the multi-layer film includes at least one layer of ethylene vinyl alcohol.

18. The method of claim 1, wherein the multi-layer film includes at least one layer of polyamide.

19. The method of claim 1, wherein the multi-layer film includes at least one layer of polyethylene.

20. The method of claim 1, further comprising the step of measuring the temperature of the film at a first position and wherein the capacitive measurement of the thickness and the measurement of the temperature of the film are carried out at the same place at said first position.

* * * * *